Patented Oct. 25, 1932

1,884,082

UNITED STATES PATENT OFFICE

HENRY JOHANNES MILLER, OF CHICAGO, ILLINOIS, ASSIGNOR TO GRIGSBY-GRUNOW COMPANY, OF CHICAGO, ILLINOIS, A CORPORATION OF ILLINOIS

COATED ELECTRON EMITTING SURFACE

No Drawing.   Application filed August 4, 1930. Serial No. 472,889.

My invention relates to coated electron emitting coatings and to the method of preparing such coatings.

It has been found that the physical character of the emitting surface has an important bearing upon the emissivity of coatings. Thus when ordinary particles of barium or strontium oxides are applied to a cathode surface, coarseness of the particles prevents the attainment of maximum efficiency.

An object of the invention is to provide an improved electron emissive coating.

A further object is to provide a coating having a fine texture to increase its emissivity.

A further object is to provide an under or overcoating of a different character than the body of the emissive surface.

A further object is to provide a coating applicable to very fine filaments.

Other objects and advantages will appear as the description proceeds.

In accordance with the general features of the invention, I provide an oxide in the colloidal state to fill in the minute voids in main oxide coating.

In practicing the invention I first prepare colloidal barium carbonate by dissolving the hydrate of barium hydroxide, $Ba(OH)_2 \cdot H_2O$, in a large quantity of methyl alcohol, $CH_3OH$. Carbon dioxide gas is then introduced into the solution precipitating a crystalline compound $(CH_3 \cdot O \cdot CO \cdot Ba \cdot O \cdot CO \cdot O \cdot CH_3)$. This compound is filtered off from the methyl alcohol and the precipitate is further washed with methyl alcohol. When water is added to this compound, colloidal barium carbonate is formed and may be separated by filtration from the methyl alcohol and water. The procedure of obtaining the colloidal barium carbonate is rather involved, and therefore, it is advantageous to use as little thereof as possible.

I have found that by providing an undercoating of an aqueous suspension of colloidal barium carbonate on an electron emitter and using non-colloidal barium carbonate thereover, very excellent results may be obtained which are far superior to the results obtained by using non-colloidal barium carbonate throughout. It is usually advisable to apply several coatings of carbonates to an emitter and therefore, the undercoating step entails no additional labor or expense than the application of the usual carbonate coating.

After an electron emitting surface has been provided with an undercoating of colloidal barium carbonate, a layer of non-colloidal barium carbonate is applied thereover. The non-colloidal barium carbonate is dissolved in methyl alcohol and amyl acetate and is sprayed on the cathode surface. During the spraying process the alcohol and acetate are substantially evaporated so that the carbonates reach the surface in a comparatively dry state. The emitter is then mounted in an envelope and exhausted, and the carbonates are converted to oxides by the application of heat, giving off carbon dioxide which is exhausted, as is well known in the art. The same result may be obtained by first depositing a layer of non-colloidal barium carbonate upon the cathode, and overcoating this layer with a thin layer of an aqueous suspension of colloidal barium carbonate.

It appears that in either case the fine colloidal particles penetrate the minute spaces between the coarser particles of the non-colloidal material, thus forming a continuous emitting surface. It has been found that the method is particularly effective when applied to very fine wire.

While the method has been described with particular reference to barium, it is equally applicable to strontium or to mixtures of barium and strontium carbonates. The colloidal strontium carbonate may be formed in the same manner as pointed out above.

What I claim as new and desire to protect by Letters Patent of the United States is:

1. A method of preparing an electron emissive surface which consists of forming an aqueous suspension of colloidal barium carbonate, coating a surface therewith, applying a coating of non-colloidal barium carbonate to said surface, and converting said carbonates to oxides.

2. A method of preparing an electron emissive surface which consists of forming an aqueous suspension of colloidal barium carbonate, undercoating a surface with said suspension, overcoating said undercoating with non-colloidal barium carbonate, and converting said carbonates to oxides by the application of heat and exhaustion.

3. A method of preparing an electron emissive surface which consists of dissolving the hydrate of barium hydroxide in a large quantity of methyl alcohol, introducing carbon dioxide into the solution, precipitating a crystalline compound, adding water to the compound to form colloidal barium carbonate, applying the colloidal barium carbonate to a surface, applying non-colloidal barium carbonate to the surface, and converting the carbonates to oxides.

4. An electron emitter comprising a cathode surface, a coating of colloidal barium oxide thereon, and a second coating of non-colloidal barium oxide.

5. An electron emitter comprising a cathode surface, an undercoating of colloidal barium oxide, and an overcoating of non-colloidal barium oxide thereon.

In witness whereof, I hereunto subscribe my name this 1st day of July, 1930.

HENRY JOHANNES MILLER.